US012710021B2

(12) United States Patent
Alexandroff

(10) Patent No.: US 12,710,021 B2
(45) Date of Patent: Aug. 18, 2026

(54) PULSED-PLASMA-DISCHARGE ENGINE AND ITS METHOD OF OPERATION

(71) Applicant: Sharp Pulse Corp., New York, NY (US)

(72) Inventor: Igor Simon Alexandroff, New York, NY (US)

(73) Assignee: Sharp Pulse Corp., New York, NY (US)

( * ) Notice: Subject to any disclaimer, the term of this patent is extended or adjusted under 35 U.S.C. 154(b) by 5 days.

(21) Appl. No.: 18/886,662

(22) Filed: Sep. 16, 2024

(65) Prior Publication Data

US 2026/0049583 A1 Feb. 19, 2026

Related U.S. Application Data

(63) Continuation of application No. 18/474,418, filed on Sep. 26, 2023, now Pat. No. 12,092,055.

(51) Int. Cl.
*F02K 7/20* (2006.01)
*B64G 1/40* (2006.01)
*F02K 7/10* (2006.01)
*F03H 1/00* (2006.01)
*H05H 1/48* (2006.01)

(52) U.S. Cl.
CPC ................ *F02K 7/20* (2013.01); *B64G 1/413* (2023.08); *F03H 1/0087* (2013.01); *F02K 7/10* (2013.01); *H05H 1/48* (2013.01)

(58) Field of Classification Search
CPC ..... F02K 7/10; F02K 7/20; F03H 1/00; F03H 1/0087; F03H 1/0093; B64G 1/413; B64G 1/415; H05H 1/48
See application file for complete search history.

(56) References Cited

U.S. PATENT DOCUMENTS 4,346,420 A 8/1982 Turchi
4,397,147 A 8/1983 Turchi
6,357,700 B1 3/2002 Provitola
8,365,510 B2 2/2013 Lugg
8,446,060 B1 5/2013 Lugg
8,720,205 B2 5/2014 Lugg
10,030,583 B2 7/2018 Burd
(Continued)

FOREIGN PATENT DOCUMENTS

CN 109184951 A * 1/2019 .............. F02C 7/057
CN 111396276 A * 7/2020 ........... F03H 1/0006

OTHER PUBLICATIONS

Andreadis, Dean, "Scramjets integrate air and space," The Industrial Physicist, vol. 10, No. 4, Aug./Sep. 2004, 7 pages.
(Continued)

*Primary Examiner* — Alain Chau
(74) *Attorney, Agent, or Firm* — Koffsky Schwalb LLC

(57) ABSTRACT

An engine in which thrust is achieved by converting electrical energy into high temperature plasma discharges that, in turn, apply thermal, pressure, and/or kinetic energy to a stream of passing air. The engine comprises a plasma region that includes a pair of gapped electrodes, such that the plasma discharges occur in the electrode gap. An energy storage device generates voltage pulses between the electrodes that electrically break down the air as the operating medium within the electrode gap and create plasma discharges.

20 Claims, 8 Drawing Sheets

(56) References Cited

U.S. PATENT DOCUMENTS

| | | | | |
|---|---|---|---|---|
| 10,047,732 | B2 * | 8/2018 | Morin | F02C 1/00 |
| 12,092,055 | B1 * | 9/2024 | Alexandroff | F03H 1/0087 |
| 2012/0151898 | A1 * | 6/2012 | Claflin | F02K 7/04<br>60/204 |
| 2020/0063967 | A1 * | 2/2020 | Leyko | F02K 7/04 |
| 2024/0117797 | A1 * | 4/2024 | Keidar | H05H 15/00 |
| 2024/0392761 | A1 * | 11/2024 | Graber | H05H 1/54 |

OTHER PUBLICATIONS

Wikipedia—Magnetoplasmadynamic thruster, available online prior to Sep. 26, 2023. (pp. 1-4).

* cited by examiner

PULSED-PLASMA-DISCHARGE ENGINE AND ITS METHOD OF OPERATION

This application is a continuation of U.S. application Ser. No. 18/474,418, filed on Sep. 26, 2023, which is incorporated by reference herein in its entirety.

FIELD OF THE INVENTION

This invention relates to a field of aerospace technology, such as to the field of aero thermodynamic airbreathing engines.

BACKGROUND OF THE INVENTION

A ramjet engine is one type of engine used in the aerospace field to allow for high-speed vehicle travel. In general, it is a form of air breathing jet engine that uses forward motion of the engine itself to compress incoming air that is then used for combustion of fuel to generate thrust. Because the engine does not produce thrust when stationary (no ram air), it (and the vehicles it powers) requires an assisted take-off, such as by a rocket. Once accelerated, though, the engine starts producing thrust. As a result, ramjet engines allow for a non-complicated and compact design that can be useful in applications requiring high speeds, such as for satellites. Because present-day ramjet engines combust fuel to generate thrust, they are referred to as combustion-type ramjets ("cramjets"). The combustion-type ramjet engine is most suitable for sustained flight in the atmosphere with supersonic speeds (between Mach 1 and Mach 5) and is referred to as scramjet.

A simplified cross-sectional diagram of a prior art scramjet engine is shown in FIG. 1. The scramjet 100 of FIG. 1 includes (i) a housing, open on both ends and having varying cross section, illustrated by references 120(*a*) and 120(*b*) (collectively referred to herein as the housing 120), and (ii) an inlet body 102 that is coaxially mounted within the housing. The housing 120 and the inlet body 102 cooperate to form three regions (zones) inside the engine: i) an air intake region 104, the cross section of which is depicted by references 104(*a*) and 104(*b*): ii) a combustion region 108, the cross section of which is depicted by references 108(*a*) and 108(*b*); and (iii) an exhaust region 110, the cross section of which is depicted by references 110(*a*) and 110(*b*).

An airstream moving with respect to the scramjet at a first speed, illustrated by arrows 101(*a*) and 101(*b*), flows into in an air-intake region (zone) of the scramjet. Because the cross section of the air-intake region narrows in the direction of air flow, as the incoming air moves through the intake region 104 on its way into the combustion region 108, it gets dynamically compressed. Combustion region 108 is where fuel (conceptually depicted by references 106(*a*) and 106(*b*)) is mixed with the passing compressed air, ignited, and burnt to produce a hot exhaust (represented by arrows 112(*a*) and 112(*b*), collectively 112). The exhaust is ejected from the combustion zone 108 into the exhaust zone 110 at speed that is greater than the speed of the incoming air. The exhaust region 110 has a form of a diverging nozzle that shapes the exhaust 112, which in turn thrusts the engine forward. An overall envelope of the exhaust, as it is ejected out of the engine 100, is represented by reference 114.

A scramjet design, however, presents several major challenges. One typical challenge is the need for a large volume of fuel to support long flight times at supersonic speeds. Another challenge is achieving proper combustion. Specifically, to produce thrust, the fuel must be injected into the air stream and combusted before the resulting exhaust is expelled out the back of the engine. Yet, at supersonic speeds, the air moves so fast that an oncoming packet of air may only be inside the engine for a few milliseconds. Because the overall process is limited by an ability to efficiently mix fuel with air and by the speed of flame propagation through the air-fuel mixture, maintaining proper combustion above supersonic speeds becomes extremely difficult. In addition, variations in the atmospheric air (density, temperature, oxygen concentration, air ionization, etc.) further impact combustion efficiency and control. Moreover, at super-hypersonic speeds, fuel injection, mixing, and combustion may need to be accomplished within microseconds. Such timing, however, is unreachable in a classical fuel supply system, including combustion-type ramjet systems. Thus, combustion-type ramjet engine is not practical for generating hypersonic and super-hypersonic speeds, e.g., Mach 22 (about 7.5 km/sec). Operation at such high speeds, however, is needed for real world applications, such as for satellites operating in low orbits, at over 50 km above earth surface.

Accordingly, what is needed is an engine and method that overcomes the problems of the prior art, such as a new ramjet engine and method of operating the engine that overcomes the problems of the prior art.

For example, what is needed is a new thrusting mechanism that can operate as super-hypersonic speeds and does not utilize combustible fuels.

For example, what is needed is a new ramjet engine that can operate effectively not only at supersonic speeds but can also operate at hypersonic and super-hypersonic speeds.

What is also needed is a ramjet engine that can provide accurate thrust control at above supersonic speeds.

What is also needed is a new ramjet engine that does not require mixing of a combustible fuel with air to develop thrust.

What is also needed is a new ramjet engine that does not use combustible fuel for generation of thrust.

SUMMARY OF THE INVENTION

An engine in which thrust is achieved by converting electrical energy into high temperature plasma discharges that, in turn, apply thermal, pressure, and kinetic energy to a stream of passing air. The engine comprises a plasma region that includes a pair of gapped electrodes, such that the plasma discharges occur in the electrode gap. An energy storage device generates voltage pulses between the electrodes that electrically break down the air within the electrode gap and create plasma discharges. The invented engine does not need any fuel or other medium to generate thrust.

The present invention is generally directed to a novel flight apparatus and a method for operating the apparatus at hypersonic and super-hypersonic speeds.

More specifically, the present invention is directed at a new thrusting mechanism that is able to achieve super-hypersonic speed without the use a combustible fuel.

More specifically, the present invention is directed at a new ramjet engine that is capable of achieving super-hypersonic speeds.

More specifically, the present invention is directed at a new ramjet engine in which thrust (propulsion) is achieved through conversion of electrical energy into thermal, pressure, and/or kinetic energy.

More specifically, the present invention is directed at a new ramjet engine in which thrust is achieved by converting electrical energy into a high temperature plasma discharge that, in turn, applies its thermal, pressure, and kinetic energy to a stream of air passing through a plasma zone (region).

More specifically, the present invention is directed at a new ramjet engine in which an energy storage device, such as a capacitor (or a bank of capacitors), is used to generate a voltage pulse that causes a high temperature plasma discharge, which in turn provides its thermal, pressure, and kinetic energy to a stream of compressed air passing through the plasma zone.

In one embodiment of the invention, a pulsed-plasma-discharge ramjet engine includes (a) a first structural body having a varying cross-section, and having a first end and a second end: (b) a second structural body having a varying cross-section, and having a first end and a second end, the second structural body securely coupled to the first structural body, wherein the first structural body and the second structural body cooperate to form an air-intake region, an air-outlet region, and a plasma region between the air-intake region and the air-outlet region, and wherein the air-intake region is configured to dynamically compress the air entering the air-intake region at a first speed and to direct the compressed air to flow into the plasma region: (c) a pair of electrodes located in the plasma region and comprising a first electrode located on the surface of the first structural body and a second electrode located on the surface of the second structural body; and (d) an energy storage device comprising a first terminal electrically coupled to the first electrode and a second terminal electrically coupled to the second electrode, wherein the energy storage device is configured to generate a voltage pulse causing electrical breakdown of the compressed air flowing between the first electrode and the second electrode, thereby creating the plasma discharge that provides energy to the compressed air, such that the compressed air flows out of the plasma region and toward the air-outlet region at a speed higher than the first speed.

In one embodiment of the invention, each of the first and second electrodes comprises a respective first end and a respective second end, wherein the first electrode includes a first longitudinal direction, wherein the second electrode includes a second longitudinal direction, and wherein each of the first longitudinal direction of the first electrode and the second longitudinal direction of the second electrode is oriented substantially in the direction of flow of the compressed air in the plasma region.

In one embodiment of the invention, the first structural body is shaped as a tube of varying cross-section and having a first longitudinal axis; wherein the second structural body is mounted within the first structural body, the second structural body having a second longitudinal axis: wherein the first longitudinal axis is identical to the second longitudinal axis: wherein the first electrode is located on an interior surface of the first structural body; and wherein the second electrode is located on an exterior surface of the second structural body.

In one embodiment of the invention, the gap between the first and second electrodes at their respective first ends is less than a gap between the first and second electrodes at their respective second ends.

In one embodiment of the invention, the plasma discharge travels along the first and second electrodes toward the air-outlet zone.

In one embodiment of the invention, the pair of electrodes comprises a plurality of equidistantly distributed pairs of electrodes.

In one embodiment of the invention, the first electrode has a first ring-shaped cross-section, and the second electrode has a second ring-shaped cross-section.

In one embodiment of the invention, the pulsed-plasma-discharge ramjet engine further comprising a component surrounding an exterior surface of the first structural body, the component producing a magnetic field between the first and second electrodes that is substantially aligned with the direction of flow of the compressed air in the plasma region, wherein the plasma discharge travels in the gap between the first and second electrodes toward the air-outlet zone in a spiral fashion.

In one embodiment of the invention, the pulsed-plasma-discharge ramjet engine, further comprises (a) a switch electrically coupling the energy storage device to the first electrode: (b) an electronic unit electrically coupled to the switch and controlling an operation of the switch, to enable delivery of the voltage pulse from the energy storage device to the first electrode; and (c) a power supply electrically coupled to the energy storage device and configured to charge the energy storage device.

In one embodiment of the invention, a method of using a pulsed-plasma-discharge ramjet engine including (a) a first structural body having a varying cross-section, and having a first end and a second end, (b) a second structural body having a varying cross-section, and having a first end and a second end, the second structural body securely coupled to the first structural body, wherein the first structural body and the second structural body cooperate to form an air-intake region, an air-outlet region, and a plasma region between the air-intake region and the air-outlet region, (c) a pair of electrodes located in the plasma region and comprising a first electrode located on a surface of the first structural body and a second electrode located on a surface of the second structural body, and (d) an energy storage device comprising a first terminal electrically coupled to the first electrode and a second terminal electrically coupled to the second electrode, the method comprises the steps of: delivering an air having a first speed into the air-intake region: dynamically compressing the air in the air-intake region: delivering the compressed air into the plasma region; generating a voltage pulse causing an electrical breakdown of the compressed air flowing between the first and second electrodes, thereby creating a plasma discharge that provides an energy to the compressed air, such that the compressed air flows out of the plasma discharge region and toward the air-outlet region at a speed higher than the first speed; and using the air-outlet region to shape the compressed air entering the air-outlet region and to create thrust.

In one embodiment of the invented method, the step of plasma discharge providing energy to the compressed air includes providing thermal energy.

In one embodiment of the invented method, the step of plasma discharge providing energy to the compressed air includes applying additional pressure to the compressed air.

In one embodiment of the invented method, the plasma discharge travels along the first and second electrodes toward the air-outlet region.

In one embodiment of the invented method, the step of plasma discharge providing energy to the compressed air further includes providing kinetic energy.

In one embodiment of the invented method, the plasma discharge travels in the gap between the first and second electrodes toward the air-outlet region in a spiral fashion.

In one embodiment, the invented method further includes a step of using an electronic control unit to control an amount of charge stored in the energy storage device, a step of using an electronic control unit to control a magnitude of the plasma discharge, and/or a step of using an electronic control unit to control a frequency of generating a voltage pulse.

In one embodiment, an invented pulsed-plasma-discharge ramjet engine includes: (a) a structural body having a varying cross-section and a first surface, wherein the structural body is configured to form, for an airstream flowing along the first surface, an air-compression zone, an air-exhaust zone, and a plasma zone between the air-compression zone and the air-exhaust zone, and wherein the structural body is configured to dynamically compress the air flowing at a first speed through the air-compression zone toward the plasma zone: (b) a pair of electrodes positioned in the plasma zone and comprising a first electrode located on the surface of the structural body and a second electrode located on the surface of the structural body; and (c) an energy storage device comprising a first terminal electrically coupled to the first electrode and a second terminal electrically coupled to the second electrode, wherein the energy storage device is configured to generate a voltage pulse causing an electrical breakdown of the compressed air flowing proximate the first electrode and the second electrode, thereby creating a plasma discharge between the first and second electrodes that provides an energy to the compressed air, such that the compressed air flows out of the plasma zone and toward the air-exhaust zone at a speed higher than the first speed.

BRIEF DESCRIPTION OF THE DRAWINGS

The accompanying figures, where like reference numerals refer to identical or functionally similar elements throughout the separate views, together with the detailed description below, are incorporated in, form part of the specification, and serve to further illustrate embodiments of concepts that include the claimed invention and explain various principles and advantages of those embodiments.

Skilled artisans will appreciate that elements in the figures, which form a part of this disclosure, are illustrated for simplicity and clarity and have not necessarily been drawn to scale. For example, the dimensions of some of the elements in the figures may be exaggerated relative to other elements to help improve understanding of embodiments of the present invention.

FIG. 6(*b*) depicts voltage and current waveforms in the electrical system of FIG. 6(*a*) during operation of the present invention.

DETAILED DESCRIPTION OF THE INVENTION

The following detailed description discloses several embodiments of the system and method of the present invention.

The invention is directed at an apparatus using pulsed plasma discharges to generate thrust while moving through air. When applied to ramjet-type engines, by utilizing pulse plasma discharges as a source of energy for the air stream in the engine, one can achieve powerful energy injections at a fraction of microsecond.

Figure 1:
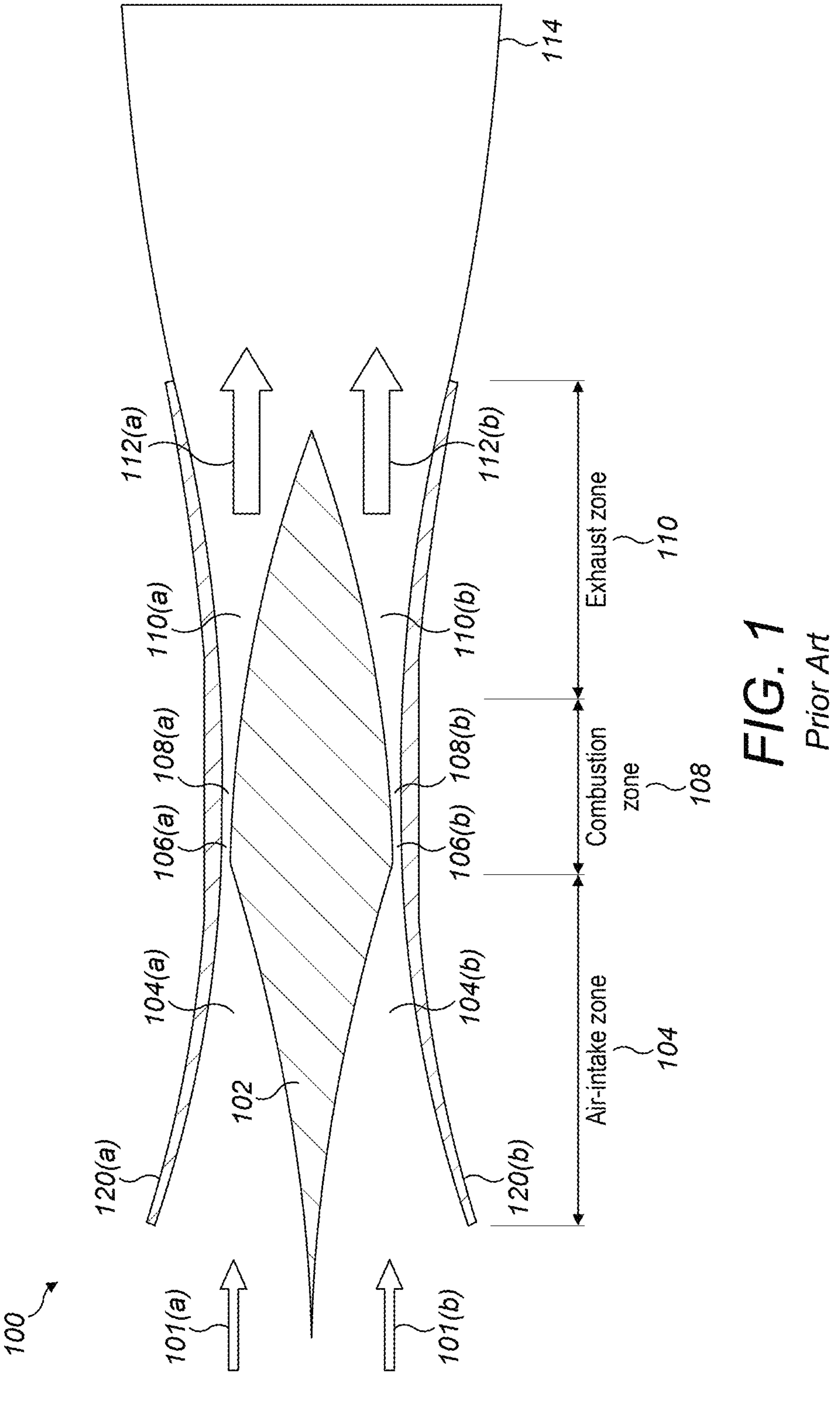
FIG. 1 illustrates a prior art combustion ramjet engine.
Figure 2:
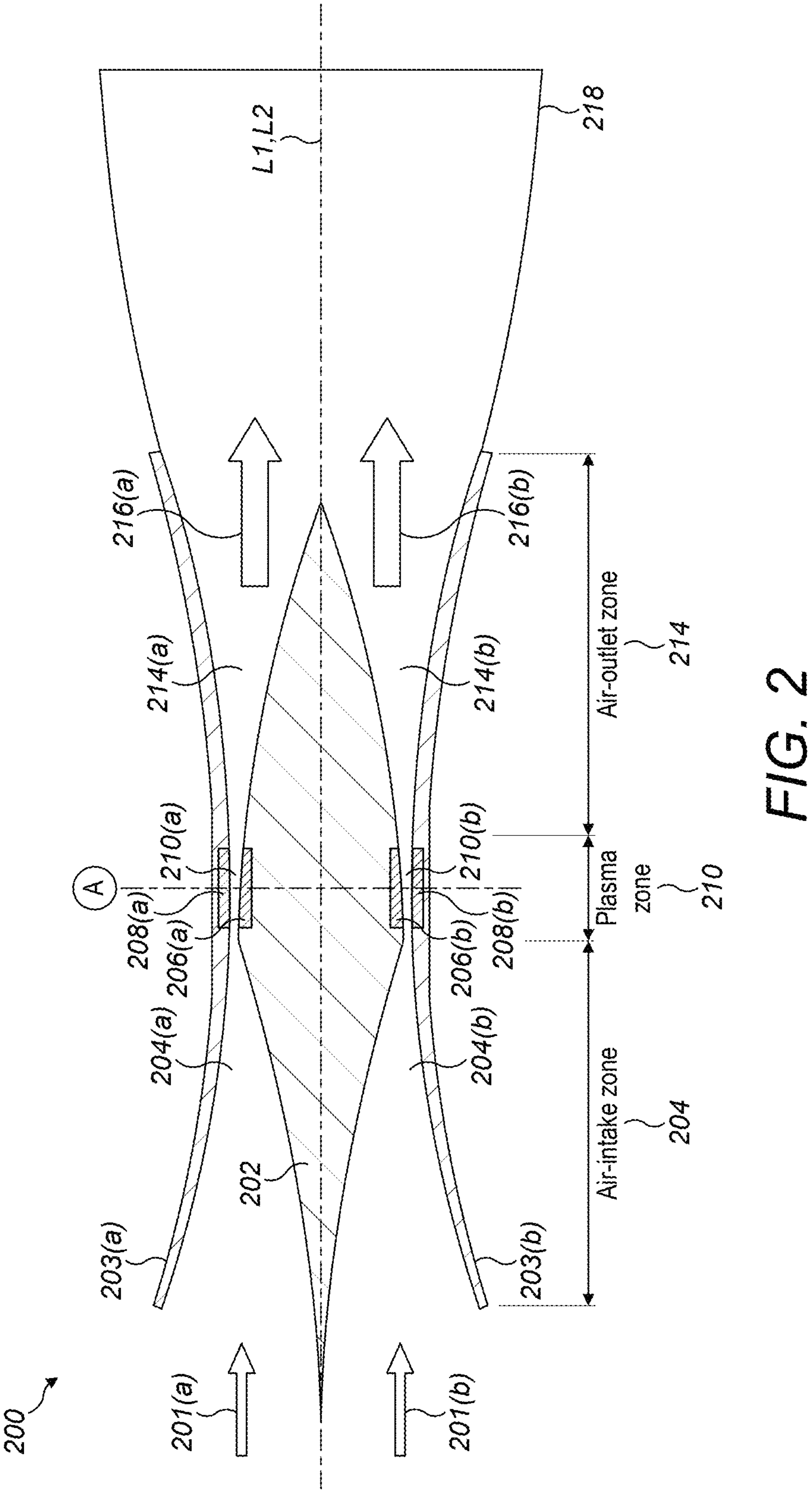
FIG. 2 shows an embodiment of a ramjet engine of the present invention.

FIG. 2 demonstrates an embodiment of a pulsed-plasma-discharge ramjet ("ppd-ramjet") engine of the present invention. The engine 200 includes (i) a housing (e.g., a tubular housing) open on both ends and having a varying cross section, illustrated by references 203(*a*) and 203(*b*) (collectively referred to herein as the housing 203), and (ii) an inlet body 202 that is coaxially mounted within the housing, such that a central lengthwise axis L1 of the housing 203 coincides with a central lengthwise axis L2 of the inlet body. The housing 203 and the inlet body 202 cooperate to form three regions inside the engine: i) an air-intake region 204, the cross section of which is depicted by references 204(*a*) and 204(*b*); (ii) an air-outlet region 214, the cross section of which is depicted by references 214(*a*) and 214(*b*); and (iii) a plasma region 210, the cross section of which is depicted by references 210(*a*) and 210(*b*), located between the air-intake region 204 and the air-outlet region 214.

The airstream moving with respect to the ramjet at a first speed, illustrated by arrows 201(*a*) and 201(*b*), flows into in an air-intake region (zone) 204 of the ramjet. Because the cross section of the air-intake region narrows in the direction of air flow, air entering the air-intake region 204 at a first speed with respect to the engine gets dynamically compressed on its way toward the plasma region (zone) region 210.

In FIG. 2, the plasma region 210 is shown as including pairs of gapped, elongated electrodes, where one electrode of an electrode pair is located on an inner surface of the housing 203 and the other electrode of the electrode pair is located on an outer surface of the inlet body 202. For example, FIG. 2 shows one electrode pair formed by electrode 206(*a*), located on the outer surface of the inlet body 202, and electrode 208(*a*), located on the inner surface of the housing 203 (cross section 203(*a*)). As shown in the embodiment of FIG. 2, the electrodes in an electrode pair are arranged in a rail-like fashion, with the gap between electrodes 206(*a*) and 208(*a*) increasing from left to right (in the direction of flow.) Another electrode pair, formed by electrode 206(*b*), located on the outer surface of the inlet body 202, and electrode 208(*b*), located on the inner surface of the housing 203 (cross section 203(*b*)). Similar to the gap between electrodes 206(*a*) and 208(*a*), the gap between the electrodes 206(*b*) and 208(*b*) also increases from left to right (in the direction of flow.) The plasma zone of the embodiment of FIG. 2 could include additional electrode pairs disposed around the circumference of the inlet body 202. In a preferred embodiment, the electrode pairs are equidistantly disposed around the circumference of the inlet body 202. Such a configuration is depicted in FIG. 3.

Figure 3:
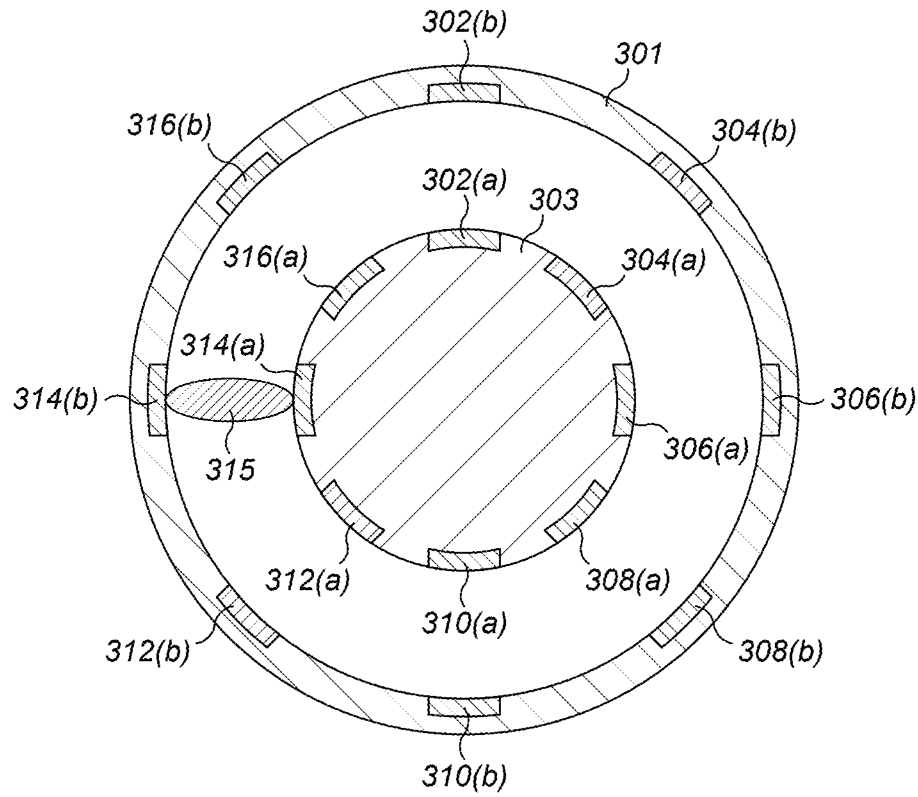
FIG. 3 shows a cross sectional view of the ramjet engine of FIG. 2, the cross section taken along plane A in FIG. 2.

While using different reference designations, FIG. 3 can be considered a cross sectional view of the ramjet engine of FIG. 2, where the cross-section is taken along plane A in FIG. 2. FIG. 3 shows an inlet body 303 coaxially located within housing 301. The inlet body includes eight electrodes equidistantly located along the inlet body's outer surface, which is electrically non-conductive. In one preferred embodiment, the outer surface of the inlet body is ceramic. These electrodes are identified by reference numerals 302(*a*), 304(*a*), 306(*a*), 308(*a*) 310(*a*), 312(*a*), 314(*a*), and 316(*a*). The housing also has eight electrodes equidistantly distributed along the housing's inner surface, which is also electrically non-conductive. In one preferred embodiment, the inner surface of the housing is ceramic. The electrodes are shown by reference numerals 302(*b*), 304(*b*), 306(*b*), 308(*b*), 310(*b*) 312(*b*), 314(*b*), and 316(*b*). As a result, the ramjet engine depicted in FIG. 3 has eight equidistantly distributed, electrically isolated pairs of gapped electrodes: 302(*a*)-302(*b*) pair, 304(*a*)-304(*b*) pair, 306(*a*)-306(*b*) pair, 308(*a*)-308(*b*) pair, 310(*a*)-310(*b*) pair, 312(*a*)-312(*b*) pair, 314(*a*)-314(*b*) pair, and 316(*a*)-316(*b*) pair.

FIG. 3 also conceptually illustrates a plasma discharge that is created in a gap between two electrodes of an electrode pair, when a voltage pulse applied between these electrodes causes electrical breakdown of the compressed air flowing through the gap. Specifically, FIG. 3 shows a plasma discharge 315 that is created in a gap between electrodes 314(*a*) and 314(*b*), when a voltage pulse applied between these two electrodes causes an electrical breakdown of the compressed air flowing through the gap between the two electrodes, creating an electrically neutral plasma. The electrically neutral plasma provides energy to the compressed air flowing in the electrode gap. This, in turn, causes the compressed air to exit the plasma region, entering the air-outlet region 214 of FIG. 2, with increased speed.

Returning to FIG. 2, the air-outlet zone 214 has a form of a diverging nozzle. It shapes the air ejected from the plasma region 210 with increased speed, which in turn thrusts the engine forward. The overall envelope of the exhausted air, as it is ejected out of the engine 200, is represented by reference 218.

Plasma discharges can transfer energy to the air passing through the plasma zone by several mechanisms: thermal energy transfer, pressure shockwaves, and kinetic energy transfer. For example, when a high voltage pulse electrically breaks down the compressed air passing between the two electrodes, an explosion occurs in the breakdown path between the electrodes, establishing a luminous and highly ionized plasma channel with temperature reaching of up to 30,000 Kelvin (30,000 K). As a result, the plasma discharge will heat up the surrounding air.

The resulting heating also increases pressure within the plasma itself, causing the plasma discharge in the air stream to expand radially outwards. The rate of this expansion is on the order of thermal velocity of the ions in the plasma. Since the temperature in the plasma is very high, the speed of plasma expansion is greater than the speed of air in the plasma region. As a result, the expansion produces a shockwave that generates tremendous pressure on the compressed air flowing through the plasma region, further pushing (applies additional pressure against) the compressed air toward the air-outlet zone 214.

In FIG. 2, the electrodes of each electrode pair are elongated and arranged in a rail-like fashion. In such a configuration, the electrodes can be electrically coupled to an energy storage device (capacitor, rechargeable battery, etc.) in a way that would force the plasma discharge, after formation, to move along the rail in the direction of air flow under the influence of the Lorentz force. As the plasma moves along the rail, it further pushes the compressed air toward the air-outlet region, transferring its kinetic energy to the surrounding air in the process. This is explained in further detail with respect to FIG. 4.

Figure 4:
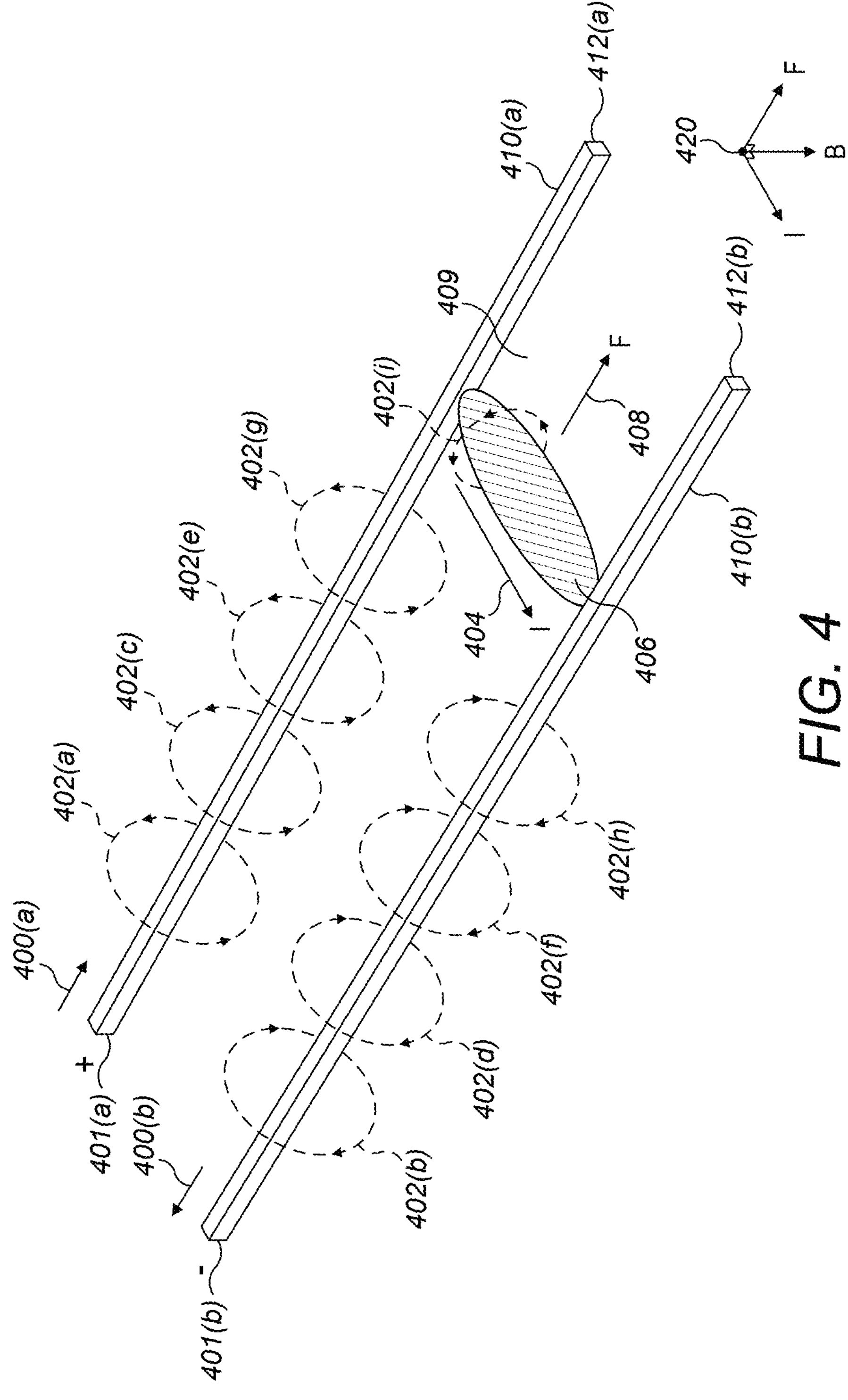
FIG. 4 depicts movement of a created plasma discharge along a pair of gapped electrodes according to an embodiment of the invention.

FIG. 4 depicts an embodiment of the present invention in which a pair of electrodes is arranged in a rail-type fashion, enabling creation of a moving plasma discharge. The plasma discharge moves along the rail under the influence of the Lorentz force, pushing against the air in front it, further contributing to the overall thrust of the novel engine. The formular describing the Lorentz force is $F=I\times B$, where F is a force vector, I is a current vector, B is a vector of a magnetic field acting on the plasma, and "x" is a cross product of the I and B vectors.

FIG. 4 shows a pair of elongated electrodes, 410(*a*) and 410(*b*), that are arranged in a rail-type fashion. Electrode (rail) 410(*a*) has two ends, a first end 401(*a*) and a second end 412(*a*). Electrode (rail) 410(*b*) also has two ends, a first end 401(*b*) and a second end 412(*b*). In one embodiment of the invention, spacing between the electrodes increases in the direction of air flow in the plasma region (FIG. 2, Ref. 210). As such, preferably the spacing between the electrodes at their second ends 412(*a*) and 412(*b*) is greater than the spacing between the electrodes at their first ends 401(*a*) and 401(*b*). Electrode 410(*a*) is conceptually shown as being electrically connected to a positive (+) terminal of an energy storage device (not shown to preserve clarity) at the first end 401(*a*) and electrode 410(*b*) is conceptually shown as being electrically connected to a negative (−) terminal of the energy storage device at the first end 401(*b*). If, when the electrical connection to the energy storage device is first established, the voltage across the first ends 401(*a*) and 401(*b*) of the respective electrodes is greater than the breakdown voltage of the air in the gap between the first ends 401(*a*) and 401(*b*), a plasma discharge will be created between those two points, and a current will start flowing through the plasma in the direction from the first end 401(*a*) to the first end 401(*b*). Thus, the current vector will be from electrode 410(*a*) toward electrode 410(*b*). At the same time, the current will generate a magnetic field around the plasma discharge. The direction of magnetic field generated around the plasma at that location will be the same as the direction of the field 402(*i*) around plasma 406, which happens later in time. This results in the Lorentz force vector being directed along the electrodes (rails), toward the second ends 412(*a*) and 412(*b*)) of the electrode pair. The Lorentz force will push the plasma toward the second ends (412(*a*) and 412(*b*)) of the electrode pair, with the plasma discharge in turn pushing against the air along the way. The respective directions of the I, B, and F vectors are shown at reference 420. As a result, the air (condensed air) present in the plasma's path will experience the Lorentz force pushing it toward the air-outlet region.

FIG. 4 further illustrates the state of the system when the plasma discharge has moved partially along the rails toward the second ends 410(*a*) and 410(*b*) of the respective electrodes. At that time, the current (I) from the positive terminal of the energy storage device will flow along the electrode 410(*a*) in the direction shown by the arrow 400(*a*), through the plasma discharge 406 in the direction shown by the arrow 404, along the electrode 410(*b*) in the direction shown by the arrow 400(*b*), returning to the negative terminal of the energy storage device.

The current flowing along the electrodes will induce a magnetic field as indicated by references 402(*a*), 402(*b*), 402(*c*), 402(*d*), 402(*e*), 402(*f*), 402(*g*), and 402(*h*). As can be seen from the figure, between the electrodes, the magnetic field is pointing down, in the same direction as the magnetic field 402(*i*) that flows around the plasma discharge 406. As a result, plasma discharge 406 will experience a Lorentz force pushing it in the direction shown by arrow 408, preserving the original vector directions depicted at reference 420. Accordingly, the air (condensed air) present in the plasma's path at that location (Ref. 409) will experience a Lorentz force pushing it toward the air-outlet region. Therefore, when plasma travels from the respective first ends 401(*a*) and 401(*b*) of the electrodes (rails) to respective second ends 410(*a*) and 410(*b*) of the electrodes under the influence of the Lorentz force, it further contributes to compression of the air stream, hence generating additional thrust.

While the rail-type electrode configuration in FIG. 4 has the electrode gap increasing in the direction of air flow, the invention also contemplates other rail-type electrode configurations. For example, the gap between the electrodes could remain the same, i.e., the electrodes (rails) could be parallel, or the gap could decrease.

Figure 5:
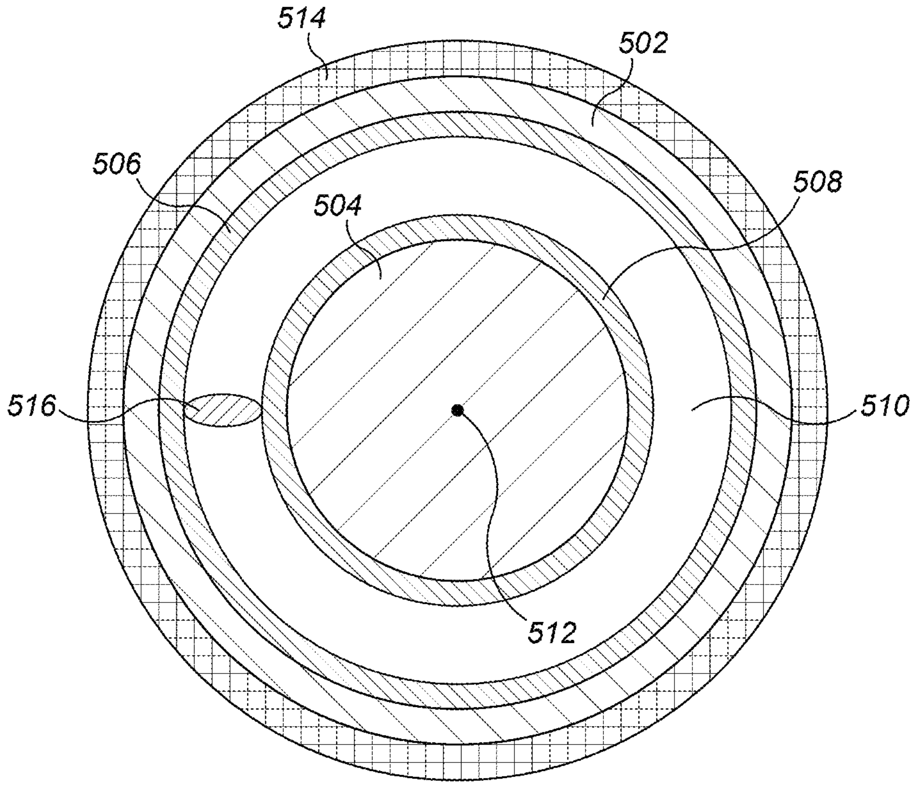
FIG. 5 shows a cross sectional view of an alternate embodiment of the ramjet illustrated in FIG. 2.
Figure 5:
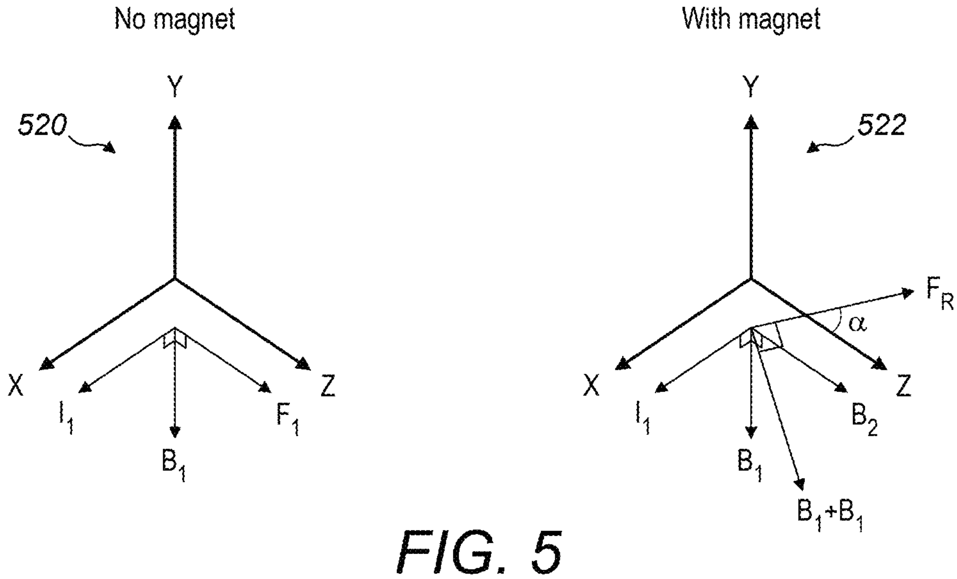

FIG. 5 shows a cross sectional view of an alternative embodiment of plasma region of the ramjet in FIG. 2 along plane A. The alternative embodiment is best understood in comparison with the embodiment of FIG. 3, described above. The embodiment of FIG. 5 includes an inlet body 504 coaxially mounted within a housing 502, similar to the inlet body 303 and housing 301 configuration in FIG. 3. However, unlike the electrode arrangement in FIG. 3, instead of having a plurality of equidistantly disposed pairs of gapped electrodes, the embodiment of FIG. 5 includes a single pair of ring-shaped gapped, coaxial electrodes. Specifically, one ring-shaped electrode 506 is located on the inner surface of the housing 502 and the other ring-shaped electrode 508 is located on the outer surface of the inlet body 504. A gap (Ref. 510) runs between the two ring-shaped electrodes along their lengths.

FIG. 5 also shows a plasma discharge 516 that is created in the gap 510 between the electrodes 506 and 508, when a voltage pulse applied between the two electrodes causes an electrical breakdown of the compressed air flowing through the gap, creating an electrically neutral plasma between two corresponding locations on the electrodes. As explained above, the created electrically neutral plasma provides energy to the compressed air flowing in the electrode gap 510. This, in turn, causes the compressed air to exit the plasma region, entering the air-outlet region 214 of FIG. 2, with increased speed. Because the plasma discharge 516 is created between two points on the two electrodes, it will experience an initial Lorentz force as described for the electrode configuration of FIG. 4. As a result, similar to the I, B, and F vector directions discussed with respect to the plasma discharge 406 in FIG. 4, the relative current ($I_1$), magnetic field ($B_1$), and Lorentz force ($F_1$) vectors for the plasma discharge 516 are shown at reference 520 in FIG. 5. If the actual direction of the current in plasma discharge 516 is from electrode 508 to electrode 506, the direction of the Lorentz force ($F_1$) on the plasma discharge will be along a straight line out of the page.

Because the two ring-shaped electrodes 506 and 508 have uninterrupted conductive surfaces that fully extend around the gap 510, the embodiment of FIG. 5 discussed above can be modified further, to steer movement of the plasma discharge 516 through the gap in a spiral fashion, as opposed to a straight line. Doing so, would extend the length of the path traveled by the plasma discharge 516 in the gap 510, thus extending the time the plasma discharge is available to provide energy to the passing air.

The modification involves introducing a second magnetic field ($B_2$), which could be accomplished by an addition of a magnet 514 surrounding the housing 502, winding an inductive coil around the housing, or using both the magnet and coil. (Note, reference 514 applies to magnet only, coil only, and to the coil-magnet combination). If the direction of $B_2$ will be out of the page (conceptually represented by reference 512), then the resulting Lorentz force will include both forward and angular components, causing the plasma discharge to move through the gap in a spiral. This is pictorially illustrated by the vectors at reference 522. Specifically, while the current vector ($I_1$) would remain the same, the new magnetic field vector would be the sum of the original magnetic field vector $B_1$ and the added magnetic field vector $B_2$. This is illustrated by the vector ($B_1$+$B_2$). The resultant Lorentz force $F_r$ will be in the direction as shown, at an angle $\alpha$ from the original, forward, direction.

Figure 6A:
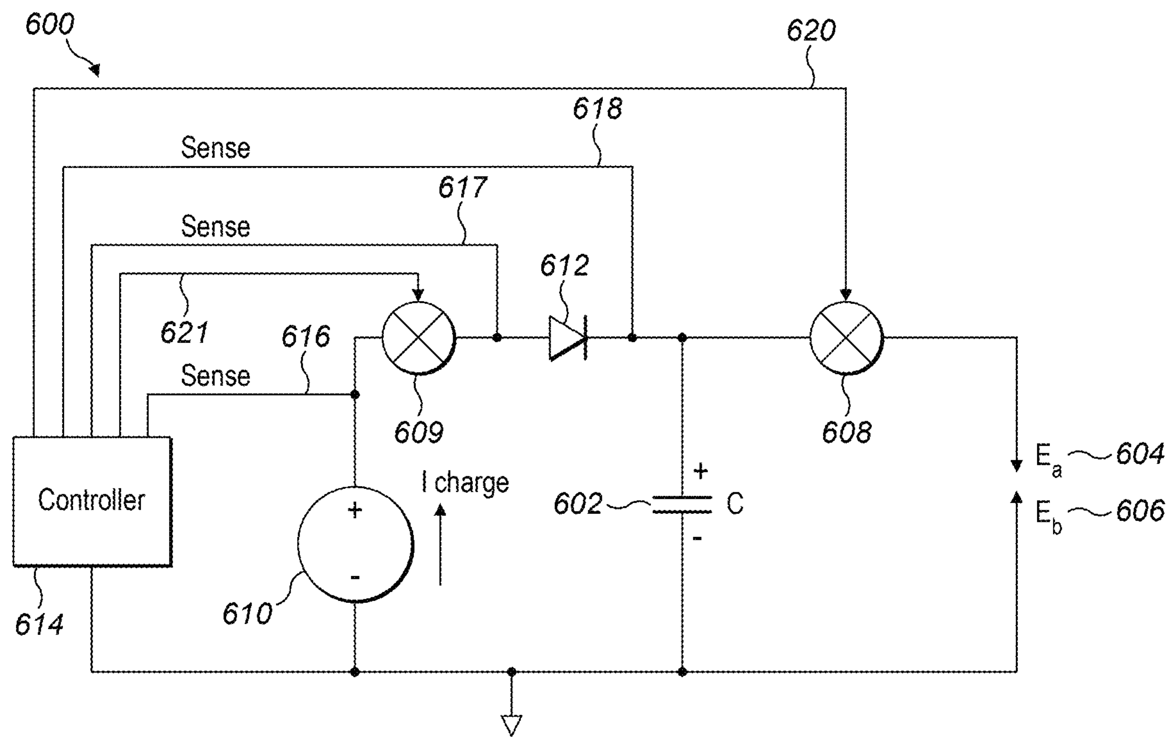
FIG. 6(*a*) shows an electrical system according to an embodiment of the present invention.
Figure 6B:
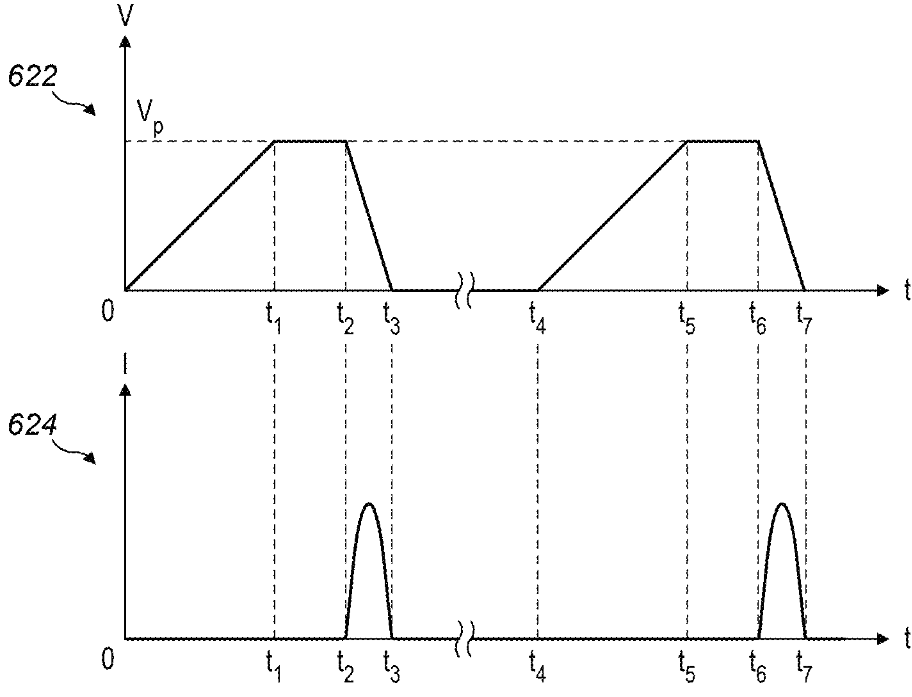

FIG. 6(*a*) shows an electrical system 600 according to an embodiment of the present invention for delivering high voltage pulses to one or more pairs of electrodes in the plasma region. To simplify the explanation, only a single pair of electrodes, electrode Ea (Ref. 604) and electrode Eb (Ref. 606), is depicted in the figure. The system 600 includes an energy storage device 602 having a positive (+) terminal and a negative (−) terminal. Although in FIG. 6(*a*) the energy storage device is depicted as a single capacitor (C), it could be implemented as a bank of capacitors connected in parallel, a battery (including a rechargeable battery), or a bank of batteries. The positive (+) terminal of capacitor 602 is electrically coupled to electrode Ea (ref. 604) via switch 608, and the negative terminal of capacitor 602 is coupled to the electrode Eb (Ref. 606) directly. A power supply 610 is electrically coupled to the capacitor 602 and is used to charge the capacitor. In the figure, the negative (−) terminal of the power supply 610 is directly connected to the negative terminal of capacitor 602 and while the positive terminal of the power supply 610 is coupled to the capacitor's positive terminal via series connection of switch 609 and element 612. When switch 609 is on (closed), element 612 allows charging current (I charge), which is used to charge the capacitor, to flow from the positive terminal of power supply 610 toward the positive terminal of the capacitor 602 only in one direction. Accordingly, in FIG. 6(*a*), element 612 is shown as a diode. (Note, switch 609 could also be placed on the other side of diode 612, right before the tapping point to the capacitor 602.) System 600 also includes an electronic control unit (controller) 614. Controller 614 is used, inter alia, to control switches 608 and 609 and to sense voltages in the circuit, such as on the respective positive terminals of the capacitor 602 and the power supply 610, and on the anode side of diode 612. Specifically, controller 614 senses voltages on the positive terminal of the power supply 610 via a sense line 616, on the anode side of the diode 612 via a sense line 617, and on the positive terminal of the capacitor 602 via a sense line 618. Controller 614 controls (opens and closes) switch 608 via a control line 620, and controls (opens and closes) switch 609 via a control line 621. During operation, the capacitor 602 can be used to generate one or more high voltage pulses across the electrodes Ea (Ref. 604) and Eb (Ref. 606) with controlled current, voltage, timing, and energy. In other words, each of the repetition, energy, current, voltage, duration, and/or number of high voltage pulses can be controlled. Operation of the electrical system 600 is further disclosed with reference to the voltage and current diagrams in FIG. 6(*b*).

FIG. 6(*b*) depicts a voltage waveform 622 across the capacitor 602 and a current waveform across the electrodes Ea and Eb during operation of the present invention. Assume that prior to time zero ("0"), switches 608 and 609 are both open (off) and the voltage across capacitor 602 is zero, i.e., it has no charge stored on it. If the power supply 610 has voltage Vp across it, closing (turning on) switch 609 will cause a charging current (I charge) to start flowing from the positive terminal of the power supply 610 into the positive terminal of capacitor 602 through the switch 609 and diode 612. At that point, voltage across capacitor 602 will begin to rise as shown and will reach level Vp at time $t_1$. During this time, because switch 608 has remained open, there was no current across the electrodes, i.e., the current was at zero ("0") level. As long as switch 608 remains open, there is no current across the electrodes and the capacitor voltage remains at Vp. This is shown on diagrams 622 and 624 as the time interval from $t_1$ through $t_2$.

At some point during the $t_1$-$t_2$ interval, the controller opens switch 609, and at $t_2$ it closes switch 608. Closure of switch 608 applies voltage Vp to the electrode Ea (Ref. 604). Assuming Vp is sufficiently high to cause an electrical breakdown of the medium (air) in the gap between the electrodes, at $t_2$, current will start to flow across them (creating a plasma discharge in the process) and the capacitor 602 will start discharging until its voltage drops to zero at time $t_3$. At $t_3$, the current will also drop to zero. During the $t_1$-$t_3$ time interval, the current pulse across the electrodes will be as shown in diagram 624. Assuming switch 609 remains open until some time $t_4$, the voltage across the capacitor will remain at zero, and there will be no current flow across the electrodes regardless of the state of switch 608.

At some point during the $t_3$-$t_4$ interval, the controller 614 opens switch 608, and at $t_4$ it closes switch 609, to begin another charge-discharge cycle. Closing (turning on) switch 609 will again cause the charging current (I charge) to start flowing from the positive terminal of the power supply 610 into the positive terminal of capacitor 602 through the switch 609 and diode 612. At that point, voltage across capacitor 602 will again begin to rise as shown and will reach level Vp at time $t_5$. During this time, because switch 608 has remained open, there was no current across the electrodes, i.e., the current remained at zero ("0") level. As long as switch 608 remains open, there is no current across the electrodes and the capacitor voltage remains at Vp. This is shown on diagrams 622 and 624 as the time interval from $t_5$ through $t_6$.

At some point during the $t_5$-$t_6$ interval, the controller opens switch 609, and at $t_6$ it closes switch 608. Closure of switch 608 at to again applies voltage Vp to the electrode Ea (Ref. 604), which again causes an electrical breakdown of the medium (air) in the gap between the electrodes. Current will again start to flow across the electrodes and the capacitor 602 will again start discharging until its voltage drops to zero at time $t_7$. At $t_7$, the current will also drop to zero. During the $t_6$-$t_7$ time interval, the current pulse across the electrodes will be as shown in diagram 624. As can be gathered from the above description, controller 614 can operate the system to deliver voltage pulses across the electrodes with frequency from a few Hertz to thousands of Hertz. The high voltage capacitor discharge process is very rapid and occurs in a range of microseconds or fraction of microsecond, which allows for an efficient energy exchange within a very high-speed air stream.

In an embodiment where element 602 is a battery, the battery will act as a current source of a given voltage, i.e., the voltage during the $t_2$-$t_3$ and $t_6$-$t_7$ periods in FIG. 6(*b*) would remain relatively constant. The current in the electrode gap would be controlled by switch 608. Once switch 608 closes, the current in the gap rises and remains at a relatively constant level until (a) the battery voltage starts dropping, at which point the current will also decrease, (b) switch 608 opens, at which point the current will drop to zero, (c) the plasma discharge traveling along the electrode pair reaches the end of the electrodes. When using a battery as the energy storage device 602, power supply 610 in FIG. 6(*a*) may not be required.

Except for placement of the electrodes, the other components of the electrical system described above may be places either (a) on or inside the housing, (b) inside the inlet body, or (c) a combination of both (a) and (b).

As understood from the above description, the invented system generates thrust (force) from electrical energy stored in capacitor 602. It's known that Energy or Work=Force*Distance, in other words J=N*m, where Energy is given in Joules (J), Force is given in Newtons (N), and Distance is given in meters (m).

It is also known that the formula for electrical energy is Energy=Power*Time. Power is usually given in Watts (W), Time is given in seconds (sec), and Energy is expressed in Joules (J). In other words, J=W*sec: W=(J/sec)=(N*m)/sec.

For example, if a body flying through air at a speed of 10,000 meters per second is experiencing a drag force of 1 Newton, to overcome the drag would require an injection of 10,000 Joules (10 kJ) of energy.

The energy stored in a capacitor can be expressed as Energy=$(C*V^2)/2$.

Accordingly, the formular for energy can be expressed as $$J=(Q*\mathrm{V})/2=((C*\mathrm{V})*\mathrm{V})/2=\left(C\left(V^2\right)/2.\right.$$

As a result, the relationship between energy (work) and voltage stored on a capacitor becomes: J=N*m=$(C*V^2)/2$. Thus, the amount of thrust (force) that a particular capacitor (energy storage device) could deliver over one meter can be expressed as $$N=\mathrm{J/m}=(\mathrm{W}*\mathrm{sec})/\mathrm{m}=\left(C*V^2\right)/(2*\mathrm{m})$$

Applying the formula W=(N*m)/sec, to compensate for 1 N of drag against a body flying at 10,000 m/sec requires injecting 10 KW of power into the air flow. Discharging 1 J of energy in 1 microsecond would generate a pulse of 1,000 kW.

When discharging a 2 μF capacitor having 100 kV across it, each discharge pulse will dissipate into the plasma, across one pair of electrodes, 10 kJ of energy. Assuming that a capacitor must be recharged after each pulse, one can calculate a necessary power level of the power supply by multiplying the energy of each pulse by the number of pulses per second. For example, assuming 50% electrical-energy-to-thrust conversion efficiency and each pulse dissipating 10 kJ, at an operating pulse frequency of 100 Hz, a 2,000 kW power supply is needed to provide a thrust of 100 N with a single pair of electrodes.

On the other hand, to achieve IN thrust at speed of 10,000 m/sec, and if the 2 μF capacitor has 10 kV across it, each discharge pulse will dissipate into the plasma across one pair of electrodes 100 J. With 50% energy conversion efficiency, to generate 10 kJ of thrust, one would need twenty pairs of electrodes, with each pair receiving one pulse per second, and 20 kW power supply.

A number of variations of the electrical system in FIG. 6(*a*) are possible. For example, when the apparatus includes multiple electrode pairs, the electrical system may include a plurality of switches 608, each separately coupling the capacitor 602 to one of more electrodes. In such a configuration, the controller 614 could separately control creation of plasma discharges on different sets of electrode pairs.

In another variation, the capacitor 602 may include a bank of capacitors (or a bank of batteries) that is reconfigurable, i.e., in which the capacitors may be connected to form a series capacitor configuration, a parallel capacitor configuration, or disconnected from the capacitor bank altogether. Reconfiguring the capacitor bank to place capacitors in a series configuration would increase the level of the voltage pulse. Placing the capacitors in a parallel configuration would increase the amount of charge that the capacitor bank could deliver, i.e., extend the $t_2$-$t_3$ period in FIG. 6(*b*).

In another variation, the controller could control output voltage of the power supply, thus changing the Vp level in FIG. 6(*b*), to which the capacitor charges, between the pulses. In another embodiment, the controller could control the amount of charging current that the power supply provides.

Any one of the above variations and their combinations are within the scope of the present invention.

As explained above, each of the repetition (frequency), energy, current, voltage, duration, and/or number of high voltage pulses can be controlled. Moreover, the invented apparatus may include sensors that sense and/measure a number of parameters, such as the drag experienced by the apparatus, velocity of the incoming airstream, density of the incoming air, temperature and humidity of the incoming air, its electrical breakdown characteristics, the system's output thrust, etc. As a result, the apparatus may process these parameters and adjust operation of the system accordingly.

Figure 7:
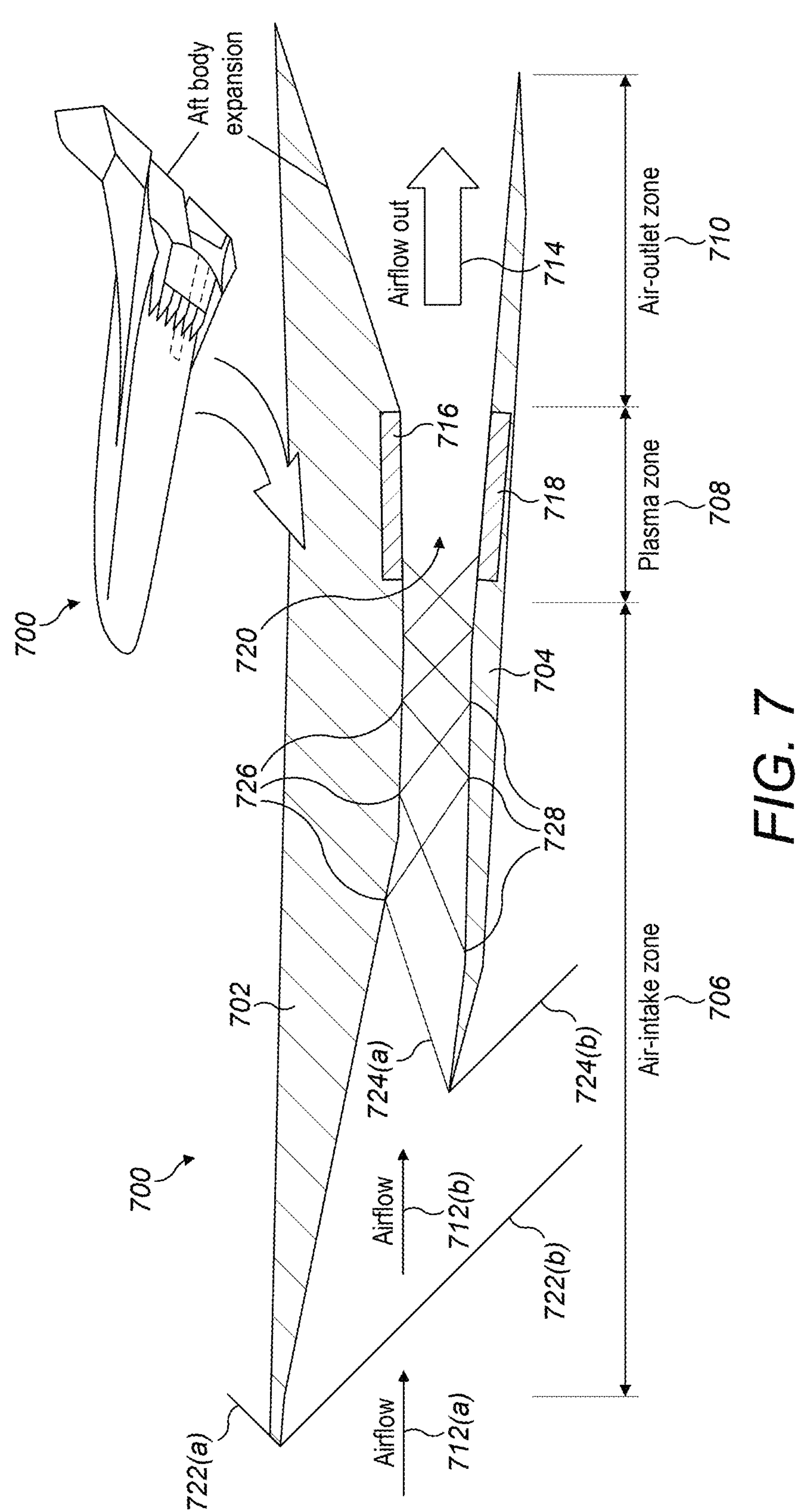
FIG. 7 shows another embodiment of a ramjet engine of the present invention.

FIG. 7 shows another ramjet engine configuration according to an embodiment of the invention. Specifically, FIG. 7 illustrates a cross section of the ramjet engine 700. The ramjet 700 includes an upper body 702 and a lower body 704 securely attached to the upper body. The upper body 702 and lower body 704 cooperate to form an air-intake zone (region) 706, a plasma zone (region) 708, and an air-outlet zone (region) 710. Intake air enters the engine at the air-intake zone 706 in the direction shown by the arrows 712(*a*) and 712(*b*) and the exhaust exits the engine at the air-outlet zone 710 in the direction shown by arrow 714. The cross-sectional view also shows a pair of elongated, gapped electrodes (Refs. 716 and 718), with electrode 716 disposed along a lower surface of the upper body 702, and electrode 718 disposed along an upper surface of the lower body 704. The two surfaces should be non-conductive, e.g., ceramic. The gap 720 between the electrodes preferably widens in the direction of the airflow. The invention, however, contemplates the airgap remaining constant, or even narrowing in the direction of the airflow.

In addition, while the cross section shows just one electrode pair, the ramjet in FIG. 7 may have a plurality of pairs of gapped electrodes. Moreover, to isolate plasma zone of each individual electrode pair, walls or baffles extending between the upper and lower bodies and running in the direction of airflow may be added. Furthermore, the walls or baffles may be profiled to provide enhanced shaping of the passing air.

FIG. 7 also illustrates shockwaves that are generated by the engine's upper and lower bodies impacting the incoming airstream. For example, when the airstream hits the front (leftmost) edge of the upper body 702, shockwave wavefronts 722(*a*) and 722(*b*) are generated, with the wavefront 722(*b*) continuing to propagate along the intake zone. When shockwave wavefront 722(*b*) hits the front (leftmost) edge of the lower body, however, it is broken into two separate shockwave wavefronts, 724(*a*) and 724(*b*), with the wavefront 724(*a*) continuing to propagate through the intake zone 706 of the engine, toward the plasma zone 708. References 726 and 728 illustrate interactions between the shockwaves and the upper and lower bodies as the airstream moves toward the plasma zone 708. On the way to the plasma zone, the air inside the intake zone gets compressed.

The compressed air entering plasma zone 708 is acted upon by the plasma discharges that are created inside it (as explained above) and is thrust out of the plasma zone 708 into the air-outlet zone 710. A profile of the air-outlet zone 710, formed by the lower surface of upper body 702 and the upper surface of the lower body 704, shapes the exiting airstream 714 (referenced in FIG. 7 as "aftbody expansion") and allows for controlled expansion of the exhaust air in the rear of the engine.

The various components of the electrical system described above may be placed either (a) on or inside the upper body, (b) inside or below the lower body, or (c) a combination of both (a) and (b).

Figure 8:
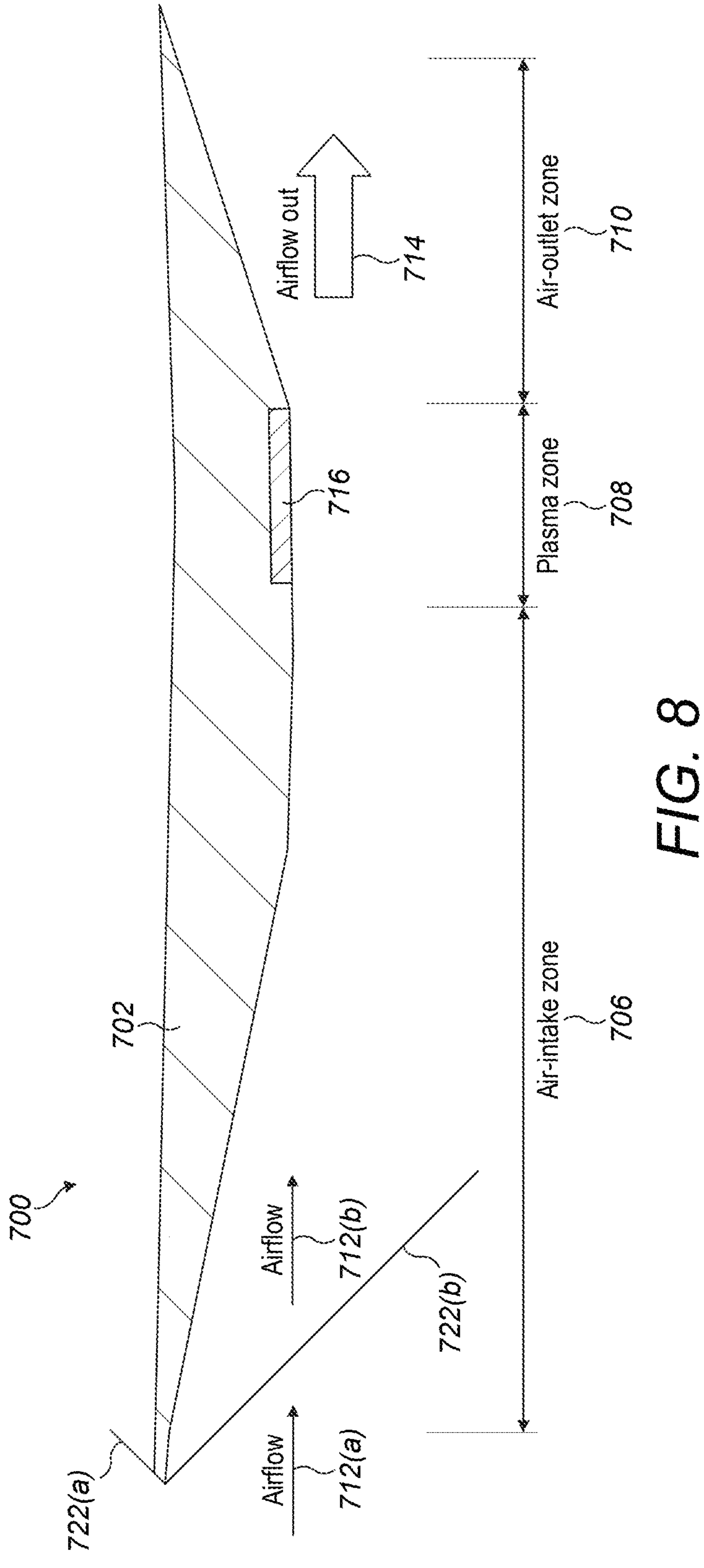
FIG. 8 show another embodiment of a ramjet engine of the present invention.

In an alternative embodiment, illustrated in FIG. 8, the engine may comprise only a single body, with all the electrode pairs being located on a surface of the body. In such a configuration, the gap between the electrodes of each electrode pair will be located between the electrodes' edges. In this case, the electrical breakdown of air passing between the electrodes will occur between electrode edges.

Under novel pulsed plasma discharge concept presented here, converting electrical power to thrust (propulsion) could be done thru multiple plasma discharges in the high-pressure area of the apparatus, which provide energy to passing air that generates thrust without the need for any fuel or other medium.

While the foregoing descriptions may disclose specific values, unless expressly stated otherwise, other specific values may be used to achieve similar results. Further, the various features of the foregoing embodiments may be selected and combined to produce numerous variations of improved systems.

In the foregoing specification, exemplary embodiments have been described. However, one of ordinary skill in the art would appreciate that various modifications and changes can be made without departing from the scope of the invention as set forth in the claims below. Accordingly, the specification and figures are to be regarded in an illustrative rather than a restrictive sense, and all such modifications are intended to be included within the scope of present teachings, and therefore the scope of the invention is to be limited only by the claims.

Moreover, in this document, relational terms such as first and second, up and down, and the like may be used solely to distinguish one entity or action from another entity or action without necessarily requiring or implying any actual relationship or order between such entities or actions. The terms "comprise(s)", "comprising", "has", "having", "includes", "including", "contains", "containing" or any other variation thereof, are intended to cover a non-exclusive inclusion, so that a process, method, article, or apparatus that comprises, has, includes or contains a list of elements does not include only those elements but may include other elements not expressly listed or inherent to such process, method, article, or apparatus. An element preceded by "comprises . . . a", "has . . . a", "includes . . . a" or "contains . . . a" does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially", "essentially", "approximately", "about" or any other version thereof, are defined as being close to as understood by one of ordinary skill in the art. The term "coupled" as used herein is defined as connected, although not necessarily directly. A device or structure that is "configured" in a certain way is configured in at least that way but may also be configured in ways that are not listed.

In addition, in the foregoing Detailed Description, various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

I claim:

1. A pulsed-plasma-discharge engine comprising:

a first structural body having a varying cross-section, and having a first end and a second end;

a second structural body having another varying cross-section, and having another first end and another second end, the second structural body securely coupled to the first structural body, wherein the first structural body and the second structural body cooperate to form an air-intake region, an air-outlet region, and a plasma region between the air-intake region and the air-outlet region, and wherein the air-intake region is configured to dynamically compress an air entering the air-intake region at a first speed, thereby generating a compressed air, and to direct the compressed air to flow into the plasma region;

a plurality of pairs of elongated electrodes positioned in the plasma region, the plurality of pair of elongated electrodes comprising (i) a first pair of elongated electrodes comprising a respective first electrode located on a surface of the first structural body and a respective second electrode located on a surface of the second structural body, and (ii) a second pair of elongated electrodes comprising a respective first electrode located on the surface of the first structural body and a respective second electrode located on the surface of the second structural body;

a first energy storage device comprising a first terminal electrically coupled to the first electrode of the first pair of elongated electrodes and a second terminal electrically coupled to the second electrode of the first pair of elongated electrodes, a second energy storage device comprising a first terminal electrically coupled to the first electrode of the second pair of elongated electrodes and a second terminal electrically coupled to the second electrode of the second pair of elongated electrodes, wherein the first energy storage device is configured to generate a first voltage pulse causing an electrical breakdown of a first portion of the compressed air, flowing between the first electrode and the second electrode of the first pair of elongated electrodes, thereby creating a plasma discharge between the first electrode and the second electrode of the first pair of elongated electrodes that travels along the first pair of elongated electrodes toward the air-outlet region, and wherein the second energy storage device is configured to generate a second voltage pulse causing an electrical breakdown of another portion of the compressed air, flowing between the first electrode and the second electrode of the second pair of elongated electrodes, thereby creating a plasma discharge between the first electrode and the second electrode of the second pair of elongated electrodes that travels along the second pair of elongated electrodes toward the air-outlet region; and a thrust controller configured to separately control generation of the first voltage pulse and the second voltage pulse.

2. The pulsed-plasma-discharge engine of claim 1, wherein, in each of the first pair of elongated electrodes and the second pair of elongated electrodes, each of the first electrode and the second electrode comprises a respective first end and a respective second end, wherein the first electrode includes a first longitudinal direction, wherein the second electrode includes a second longitudinal direction, and wherein each of the first longitudinal direction of the first electrode and the second longitudinal direction of the second electrode is oriented substantially in a direction of flow of the compressed air in the plasma region.

3. The pulsed-plasma-discharge engine of claim 2, wherein the first structural body is shaped as a tube of varying cross-section and having a first longitudinal axis;

wherein the second structural body is mounted within the first structural body, the second structural body having a second longitudinal axis;

wherein the first longitudinal axis is identical to the second longitudinal axis; and wherein, in each of the first pair of elongated electrodes and the second pair of elongated electrodes, the first electrode is located on an interior surface of the first structural body and the second electrode is located on an exterior surface of the second structural body.

4. The pulsed-plasma-discharge engine of claim 3, wherein the plurality of pairs of elongated electrodes comprises a plurality of equidistantly distributed pairs of electrodes.

5. The pulsed-plasma-discharge ramjet engine of claim 2, wherein the first terminal of the first energy source is electrically coupled to the first electrode of the first pair of elongated electrodes at a respective first end of the first electrode of the first pair of elongated electrodes; and wherein the second terminal of the first energy source is electrically coupled to the second electrode of the first pair of elongated electrodes at a respective first end of the second electrode of the first pair of elongated electrodes.

6. The pulsed-plasma-discharge engine of claim 2, wherein, in the first pair of elongated electrodes, a gap between the first end of the first electrode and the first end of the second electrode is less than another gap between the second end of the first electrode and the second end of the second electrode.

7. The pulsed-plasma-discharge engine of claim 1, further comprising:

a first switch electrically coupling the first energy storage device to the first pair of elongated electrodes;

and a second switch electrically coupling the second energy storage device to the second pair of elongated electrodes;

wherein the thrust controller controls delivery of the first voltage pulse by controlling the first switch and controls delivery of the second voltage pulse by controlling the second switch; and a power supply electrically coupled to the first energy storage device and the second energy storage device, and configured to charge the first energy storage device and the second energy storage device.

8. A method of operating a pulsed-plasma-discharge engine comprising (a) a first structural body having a varying cross-section, and having a first end and a second end, (b) a second structural body having another varying cross-section, and having another first end and another second end, the second structural body securely coupled to the first structural body, wherein the first structural body and the second structural body cooperate to form an air-intake region, an air-outlet region, and a plasma region between the air-intake region and the air-outlet region, (c) a plurality of pairs of elongated electrodes positioned in the plasma region, the plurality of pair of elongated electrodes comprising (i) a first a pair of elongated electrodes comprising a respective first electrode located on a surface of the first structural body and a respective second electrode located on a surface of the second structural body, and (ii) a second pair of elongated electrodes comprising a respective first electrode located on the surface of the first structural body and a respective second electrode located on the surface of the second structural body, (d) a first energy storage device comprising a first terminal electrically coupled to the first electrode of the first pair of elongated electrodes and a second terminal electrically coupled to the second electrode of the first pair of elongated electrodes, and a second energy storage device comprising a first terminal electrically coupled to the first electrode of the second pair of elongated electrodes and a second terminal electrically coupled to the second electrode of the second pair of elongated electrodes, and (e) a thrust controller, the method comprising the steps of:

delivering an air having a first speed into the air-intake region;

dynamically compressing the air in the air-intake region, thereby generating a compressed air;

delivering the compressed air into the plasma region;

controlling engine thrust by:

a) generating a first voltage pulse causing an electrical breakdown of a first portion of the compressed air, flowing between the first electrode of the first pair of elongated electrodes and the second electrode of the first pair of elongated electrodes, thereby creating a first plasma discharge between the first electrode of the first pair of elongated electrodes and the second electrode of the first pair of elongated electrodes that travels along the first pair of elongated electrodes toward the air-outlet region and provides an energy to the first portion of the compressed air, such that the first portion of the compressed air flows out of the plasma discharge region and into the air-outlet region at a speed higher than the first speed; and (b) separately generating a second voltage pulse causing an electrical breakdown of another portion of the compressed air, flowing between the first electrode of the second pair of elongated electrodes and the second electrode of the second pair of elongated electrodes, thereby creating a second plasma discharge, between the first electrode of the second pair of elongated electrodes and the second electrode of the second pair of elongated electrodes, that travels along the second pair of elongated electrodes toward the air-outlet region and provides an energy to the second portion of the compressed air, such that the second portion of the compressed air flows out of the plasma discharge region and into the air-outlet region at a speed higher than the first speed.

9. The method of claim 8, wherein the step of the first plasma discharge providing energy to the first portion of the compressed air includes providing a thermal energy.

10. The method of claim 8, where the step of the first plasma discharge providing energy to the first portion of the compressed air further includes applying an additional pressure to the compressed air.

11. The method of claim 8, wherein the step of controlling engine thrust comprises controlling at least one of a first amount of energy stored in the first energy storage device and a second amount of energy stored in the second energy storage device.

12. The method of claim 8, wherein the step of controlling engine thrust comprises controlling at least one of a magnitude of the first plasma discharge and a magnitude of the second plasma discharge.

13. The method of claim 8, wherein the step of controlling engine thrust comprises controlling at least one of a first frequency of the first voltage pulse and a second frequency of the second voltage pulse.

14. A pulsed-plasma-discharge engine comprising:

a structural body having a varying cross-section and a first surface, wherein the structural body is configured to form, for an airstream flowing along the first surface, an air-compression zone, an air-exhaust zone, and a plasma zone between the air-compression zone and the air-exhaust zone, and wherein the structural body is configured to dynamically compress an air flowing at a first speed through the air-compression zone toward the plasma zone, thereby generating a compressed air;

a pair of elongated electrodes positioned in the plasma zone and comprising a first electrode located on the first surface of the structural body and a second electrode located on the first surface of the structural body;

an energy storage device comprising a first terminal electrically coupled to the first electrode and a second terminal electrically coupled to the second electrode, wherein the energy storage device is configured to generate a voltage pulse causing an electrical breakdown of the compressed air flowing proximate the first electrode and the second electrode, thereby creating a plasma discharge between the first electrode and the second electrode that travels along the pair of elongated electrodes toward the air-exhaust zone and provides an energy to the compressed air, wherein the first electrode includes a first end, a second end, and a first longitudinal direction, wherein the second electrode includes a respective first end, a respective second end, and a second longitudinal direction, wherein each of the first longitudinal direction of the first electrode and the second longitudinal direction of the second electrode is oriented substantially in a direction of flow of the compressed air in the plasma zone, and wherein a gap between the first end of the first electrode and the first end of the second electrode is less than another gap between the second end of the first electrode and the second end of the second electrode; and a thrust controller configured to control generation of the voltage pulse.

15. A pulsed-plasma-discharge engine comprising:

a structural body having a varying cross-section and a first surface, wherein the structural body is configured to form, for an airstream flowing along the first surface, an air-compression zone, an air-exhaust zone, and a plasma zone between the air-compression zone and the air-exhaust zone, and wherein the structural body is configured to dynamically compress an air flowing at a first speed through the air-compression zone toward the plasma zone, thereby generating a compressed air;

a first pair of elongated electrodes positioned in the plasma zone on the first surface of the structural body and a second pair of elongated electrodes positioned in the plasma zone on the first surface of the structural body, wherein each of the first pair of elongated electrodes and the second pair of elongated includes a respective first electrode and a respective second electrode;

a first energy storage device and a second energy storage device, wherein each of the first energy storage device and the second energy storage device includes a respective first terminal and a respective second terminal;

wherein the first terminal of the first energy storage device is electrically coupled to the first electrode of the first pair of elongated electrodes and the second terminal of the first energy storage device is electrically coupled to the second electrode of the first pair of elongated electrodes;

wherein the first terminal of the second energy storage device is electrically coupled to the first electrode of the second elongated pair of electrodes and the second terminal of the second energy storage device is electrically coupled to the second electrode of the second elongated pair of electrodes;

wherein the first energy storage device is configured to generate a first voltage pulse causing an electrical breakdown of the compressed air flowing proximate the first electrode of the first pair of elongated electrodes and the second electrode of the first pair of elongated electrodes, thereby creating a first plasma discharge between the first electrode of the first pair of elongated electrodes and the second electrode of the first pair of elongated electrodes that travels along the first pair of elongated electrodes toward the air-exhaust zone and provides a first amount of energy to the compressed air;

wherein the second energy storage device is configured to generate a second voltage pulse causing an electrical breakdown of the compressed air flowing proximate the first electrode of the second pair of elongated electrodes and the second electrode of the second pair of elongated electrodes, thereby creating a second plasma discharge between the first electrode of the second pair of elongated electrodes and the second electrode of the second pair of elongated electrodes that travels along the second pair of elongated electrodes toward the air-exhaust zone and provides a second amount energy to the compressed air; and wherein the thrust controller is configured to separately control generation of the first voltage pulse and the second voltage pulse.

16. The pulsed-plasma-discharge engine of claim 15, wherein the thrust controller is configured to separately control at least one of (i) a first amount of energy stored in the first energy storage device and (ii) a second amount of energy stored in the second energy storage device.

17. The pulsed-plasma-discharge engine of claim 15, wherein the thrust controller is configured to separately control at least one of (i) a magnitude of the first plasma discharge and (ii) a magnitude of the second plasma discharge.

18. The pulsed-plasma-discharge engine of claim 15, wherein the thrust controller is configured to separately control at least one of (i) a first frequency of the first voltage pulse and (ii) a second frequency of the second voltage pulse.

19. A pulsed-plasma-discharge engine comprising:

a structural body having a varying cross-section and a first surface, wherein the structural body is configured to form, for an airstream flowing along the first surface, an air-compression zone, an air-exhaust zone, and a plasma zone between the air-compression zone and the air-exhaust zone, and wherein the structural body is configured to dynamically compress an air flowing at a first speed through the air-compression zone toward the plasma zone, thereby generating a compressed air;

a pair of elongated electrodes positioned in the plasma zone and comprising a first electrode located on the first surface of the structural body and a second electrode located on the first surface of the structural body, wherein the first electrode includes a first end, a second end, and a first longitudinal direction, and wherein the second electrode includes a respective first end, a respective second end, and a second longitudinal direction;

an energy storage device electrically coupled to the pair of elongated electrodes, wherein the energy storage device is configured to generate a voltage pulse causing an electrical breakdown of the compressed air flowing proximate the first electrode and the second electrode, thereby creating a plasma discharge between the first electrode and the second electrode that travels along the pair of elongated electrodes toward the air-exhaust zone and provides an energy to the compressed air, and wherein each of the first longitudinal direction of the first electrode and the second longitudinal direction of the second electrode is oriented substantially in a direction of flow of the compressed air in the plasma zone; and a thrust controller configured to control generation of the voltage pulse, wherein the energy storage device is electrically coupled to the first electrode and the second electrode in a way that allows the plasma discharge to move along the pair of elongated electrodes under the influence of Lorentz force, thereby contributing to an overall thrust of the pulsed-plasma-discharge engine.

20. The pulsed-plasma-discharge engine of claim 19, wherein a first terminal of the energy source is electrically coupled to the first electrode at the first end of the first electrode and a second terminal of the energy source is electrically coupled to the second electrode at the first end of the second electrode.

* * * * *